United States Patent Office 2,927,315
Patented Mar. 1, 1960

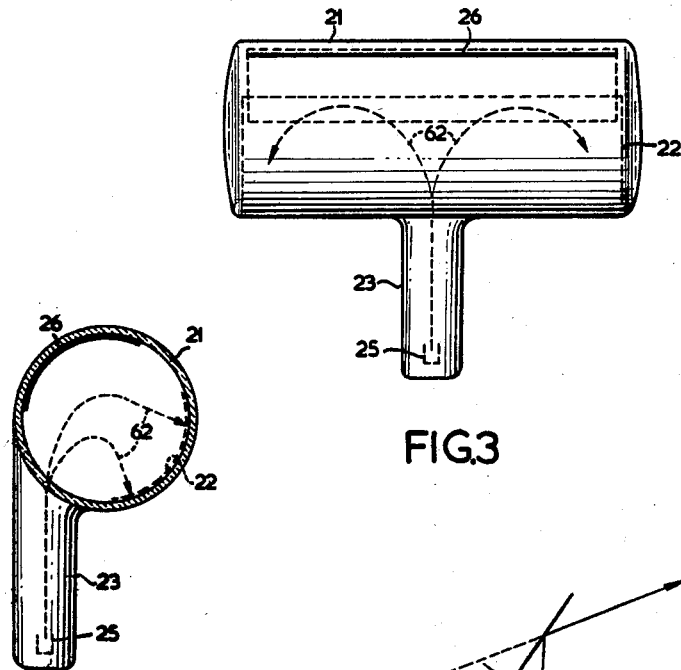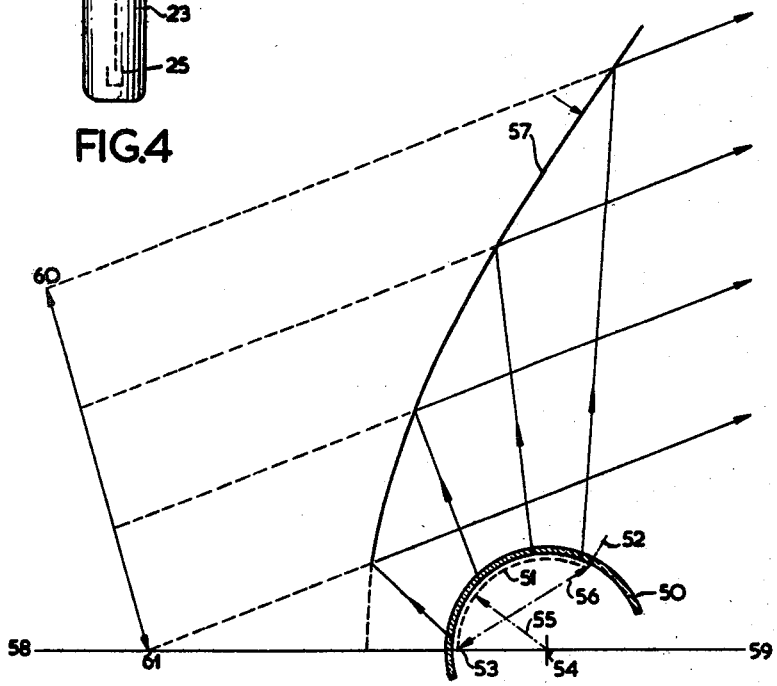

2,927,315

SCANNING AND DISPLAY DEVICE FOR TELEVISION AND LIKE PURPOSES

Nigel David Ritchie Calder, Crawley, and Pieter Schagen, Salfords, near Redhill, England, assignors to North American Philips Company, Inc., New York, N.Y., a corporation of Delaware Application March 14, 1957, Serial No. 646,147

Claims priority, application Great Britain March 14, 1956

5 Claims. (Cl. 340—370)

This invention relates to a device for displaying images by means of a cathode-ray tube and is particularly suited to the display of television images.

Owing to the tendency to display ever larger images, more particularly to display television images by means of the so-called direct-vision method, the size of the cathode-ray tubes used has become very large. The great length of the tube at right angles to the image plane gives rise to difficulties in mounting the tube in an apparatus. Consequently, endeavours have been made to find methods to reduce the size of the tube at right angles to the image plane while retaining the large image surface area. It has, for example, been proposed to bend over the neck of the cathode-ray tube and to direct the electron beam onto the screen by means of a special electrostatic or electromagnetic lens or mirror. Another solution is to use optical magnifying projecting means, the real image being very small so that the cathode-ray tube can be of small size. This latter method has the disadvantage that it requires large and expensive optical means which again occupy much room.

It has also been proposed to use a conventional cathode-ray tube on which an image is produced which is compressed in one direction, the image being viewed in a cylindrical mirror which restores the correct aspect ratio. This solution has a serious disadvantage in that the image is produced in the cathode-ray tube on a substantially flat plane and that the viewer, due to the cylindrical mirror, gets the impression of a curved image.

It is an object of the present invention to avoid a great length of the cathode-ray tube at right angles to the direction of viewing and to overcome the disadvantages attendant on the above-mentioned solutions.

According to the invention, a device for displaying images more particularly television images, comprises the combination of a cathode-ray tube having a cylindrical luminescent screen and of cylindrical optical magnifying means, the generatrices of the luminescent screen and of the optical means extending parallel to each other, while the luminescent screen, when viewed from the optical means, is convex and curved so that in the cross-section in a plane at right angles to the generatrices the maxmium radius of curvature of the operative screen surface is smaller than the chord of this surface.

The term "cylindrical" is used herein to denote the mathematical shape which may, for example, be circular cylindrical, elliptical cylindrical, hyperbolic cylindrical or parabolic cylindrical. Preferaby, however, use is made of a circular cylindrical luminescent screen.

The term "operative screen surface" is used herein to denote the screen part on which the image is traced, for it will be appreciated that the surface area of the luminescent screen can be made larger than the area of which an image is formed by the optical means, particularly if the viewed image is required to give a plane impression. Consequently, in such an image screen, the maximum dimensions of the image are predetermined. In a circular cylindrical cathode-ray tube, for example, the screen may without difficulty be applied over an angle of 270° of the circumference, however, it will be appreciated that such a highly curved screen cannot readily be displayed by optical means in a manner such that curvature of the viewed image must be considered out of the question.

The most important advantage attaching to the invention consists in that, in spite of the high degree of curvature of the luminescent screen in the cathode-ray tube, the viewer can be given the impression of a flat or plane image by a suitable configuration of the optical means.

The cylindrical optical means may be a cylindrical lens, however, they are preferably designed as a cylindrical mirror since the latter can be considerably less bulky and furthermore does not introduce chromatic aberration. More particularly, use is made of a magnifying mirror the cross-section of which is parabolic or hyperbolic.

On the cathode-ray tube there is preferably produced an image which, in a direction parallel to the generatrices of the cylindrical luminescent screen, is of the desired size, but in a direction at right angles thereto is compressed. By means of the magnifying cylindrical optical means the correct aspect ratio of the image can be restored for the viewer.

When displaying television-images, either the line scan-direction or the frame-scan direction can be made to coincide with the direction of the generatrices of the luminescent screen. Use is preferably made of the first method, since the viewing angle in a plane at right angles to the generatrices of the cylindrical optical magnifying means is reduced and the viewing angle in a direction parallel to the generatrices can be more readily extended by using a cylindrical optical magnifying means having a larger size in the direction parallel to the generatrices. For viewing television images, a wide viewing angle in the vertical direction (with the normal orientation of teelvision images, that is to say with a horizontal direction of the line-scan) is less important than a wide viewing angle in the horizontal direction.

When using a cathode-ray tube having a circular cylindrical luminescent screen on which the image is produced, the electron gun can be disposed in various manners. Preferably the gun is accommodated in a neck the axis of which is at right angles to or intersects at right angles with, the axis of the luminescent screen. If this axis is intersected, the tube will be mallet shaped. Such a mallet shape of a cathode-ray tube is known per se. However, this known tube was not used for displaying images but was intended for the photographic recording of oscillograms. Only a single line was traced in the tube. The motion at right angles to this line was obtained by pulling a film past the cylindrical screen.

Alternatively, the electron gun may be so disposed that the electron beam is emitted in a direction parallel to the generatrices.

Further advantages of the invention are, for example, the low weight of the cathode-ray tube and the small degree of image distortion when using large angles of deflection of the electron beam, for the deflection can be carried out substantially in one direction.

The scanning spot on the luminescent screen of the cathode-ray tube may be of elongated form with its major axis parallel to the direction of the generatrices of that screen. This ensures maximum brightness for a given beam density and is consequently preferable to a circular scanning spot of lesser diameter. Owing to the cylindrical optical magnifying means, the elongated scanning spot is substantially rectangular or square for the viewer.

The device in accordance with the invention is readily adaptable to the display of coloured television images.

It is particularly suitable for use with display systems according to the dot-sequential method. As is known, in this method the luminescent screen comprises triplets of phosphor strips which luminesce in different colours.

In order that the invention may readily be carried into effect, two embodiments thereof will now be described, by way of example, with reference to the accompanying diagrammatic drawings, in which:

Fig. 2 is a cross-sectional view of the device shown in Fig. 1;

Fig. 3 is an elevation of a modified form of a cathode-ray tube having a circular cylindrical luminescent screen, and, Fig. 4 is a cross-sectional view of the tube shown in Fig. 3 taken at right angles to the generatrices of the luminescent screen.

Figure 1:
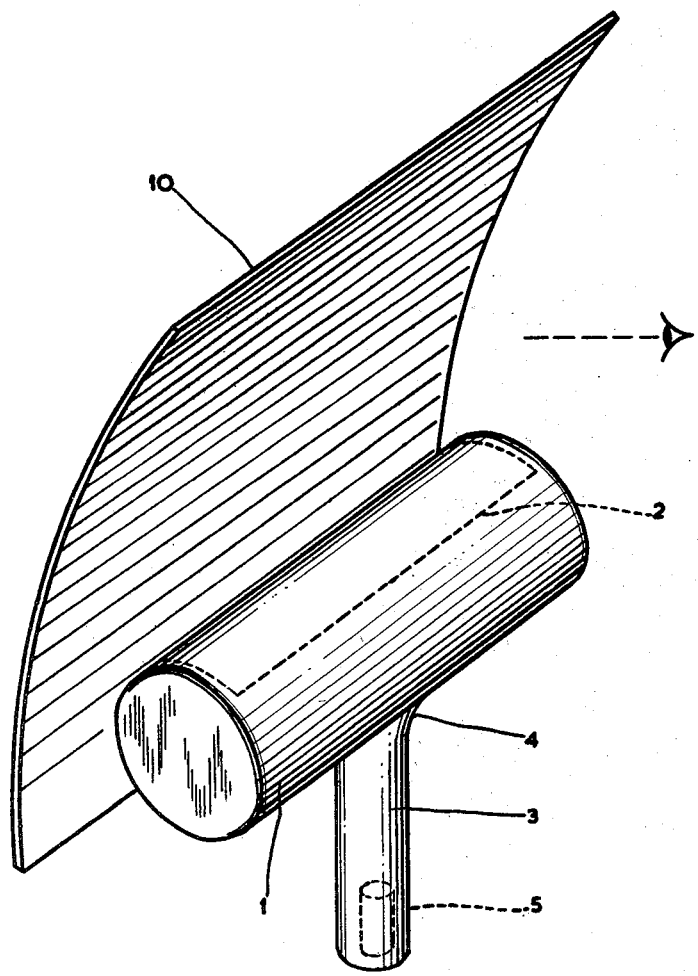
Fig. 1 is a perspective view of a device having a luminescent screen curved into the form of a circular cylinder.

Referring to Fig. 1, a cathode-ray tube comprises a right circular cylindrical part 1 provided with a luminescent screen 2 and a neck 3 in which an electrode system 5 is mounted. The deflecting system, which is not shown for the sake of clarity, is provided around or in the neck. The luminescent screen 2 extends throughout the entire length of the cylindrical part 1 of the tube, but its size is reduced in a direction at right angles thereto.

The image which is produced on the screen 2, is viewed in a magnifying mirror 10 which has a hyperbolic cross-section in a direction at right angles to the generatrices of the luminescent screen 2. The generatrices of the mirror 10 extend parallel to the generatrices of the screen 2.

In order to provide a wider viewing angle in a plane containing the generatrices, it is only required to increase the longitudinal dimensions of the mirror; the size of the screen 2 and the height of the mirror can remain unaltered.

The arrangement shown in Fig. 1 provides a very compact television receiver, since the neck 3 of the tube is at an angle of small value or even of zero value to the perpendicular and, in addition, can be short owing to the large angles of deflection which can be used without difficulty for the line scan directions. This is illustrated by the following dimensions, which relates to a picture having a diagonal of 51 cms. and the usual aspect ratio of 3:4. The deflection angle for the line scan is 120°.

(1) Chord of the mirror: 54.5 cms.
(2) Width of the mirror in the horizontal direction: 70 cms.
(3) Horizontal viewing angle: 60°–90°.
(4) Diameter of part 1 of the tube: 15.2 cms.
(5) Axial length of the luminescent screen 2: 40.5 cms.
(6) Total height of the cathode-ray tube: 28 cms.
(7) Total depth of the arrangement taken from the back of the mirror to the front of part 1 of the tube: 22.8 cms.

In the cross-sectional view of Fig. 2, there is provided on a cylindrical tube wall 50 a luminescent screen 51 indicated by a broken line and extending between points 52 and 53. The angle through which it extends is about 120°. The centre of the circular screen is designated 54 and the radius of the circle is designated 55.

In accordance with the requirement that the chord of the operative part of the surface of the luminescent screen should exceed the maximum radius of curvature, in this embodiment in which the radius of curvature is the same at all points, the chord 56 is greater than the radius 55. In this embodiment, the "operative surface" of the luminescent screen is equal to the entire screen. A viewer who looks in the hyperbolic mirror 57 sees the entire screen 51 substantially as a flat plane. If the luminescent screen were to extend beyond points 52 and 53, it would still be required for the chord 56 to exceed the radius 55, since the parts of the screen beyond the points 52 and 53 would not be viewed in a flat plane.

Since the drawing is to scale, the various dimensions and the curvature of the mirror 57 can be deduced from the figure, since it is given that the radius 55 is 7.6 cms. and that the hyperbola of the cross-section of the mirror 57, the axis of symmetry of which is indicated by the line 58—59, satisfies the formula:

$$\frac{x^2}{a^2} - \frac{y^2}{b^2} = 1$$

where $a^2 = 900$ cm.$^2$
and $b^2 = 1125$ cm.$^2$

As will be seen from the figure, the line 58—59 passes through the centre 54. Furthermore a number of light rays are shown in the figure, which are emitted from various points of the screen 51. They are reflected back according to parallel lines. An observer looking in the direction of these lines sees a plane image 60—61 of the cylindrical surface 51.

Figs. 3 and 4 show a tube in which the neck 23, which contains the electron gun 25, is secured tangentially to the cylindrical portion 21. Reference numeral 26 denotes an electron mirror electrode for directing the electron beam 62 onto the luminescent screen 22 which is asymmetrically disposed in the tube in relation to the neck 23 and the electron gun 25. In this embodiment the frame deflection can be effected entirely or in part by varying the potential of the electron mirror 26. The line deflection is effected by normal deflecting means (not shown) so that the beam follows the path shown in Fig. 3.

The tube shown in Figs. 3 and 4 can be arranged facing a parabolic or hyperbolic magnifying mirror so that the neck extends under the mirror. Thus, very little space is occupied while nevertheless a long trajectory can be used for the electron beam, and this results in easier focussing.

What is claimed is:

1. An image-display device comprising the combination of: a cathode-ray tube having beam-producing means and a cylindrical, beam-receiving screen for producing the image to be displayed, and cylindrical, optical, magnifying means for viewing the image on said screen, both the screen and magnifying means constituting surfaces of revolution formed by generatrices and being arranged relative to one another so that these generatrices extend parallel to one another, the image-displaying portion of said screen being convex relative to the magnifying means and having a maximum radius of curvature in a plane at right angles to its generatrix that is smaller than the chord in that plane subtending the said image-displaying portion, whereby a substantially flat image is obtained.

2. A device as set forth in claim 1 wherein the screen is circular-cylindrical, and the magnifying means is a curved mirror with a parabolic reflecting surface.

3. An image-display device comprising the combination of: a cathode-ray tube having beam-producing means and a cylindrical, beam-receiving screen for producing the image to be displayed, and cylindrical, optical, magnifying means for viewing the image on said screen, both the screen and magnifying means constituting surfaces of revolution formed by generatrices and being arranged relative to one another so that these generatrices extend parallel to one another, the image-displaying portion of said screen being convex relative to the magnifying means and having a maximum radius of curvature in a plane at right angles to its generatrix that is smaller than the chord in that plane subtending the said image-displaying portion, said image-displaying portion producing an image whose width is equal to the width of the final image but whose height is compressed relative to that of the final image; said magnifying means comprising a curved mirror for expanding the height of the compressed image to an extent that a substantially flat final image is obtained.

4. A device as set forth in claim 3 wherein the cathode-ray tube comprises a right-circular cylindrical portion containing the beam-receiving screen and whose axial length exceeds the diameter of the cylinder, and a neck portion whose axis extends substantially perpendicular to the axis of the cylinder and housing the beam-producing means.

5. A device as set forth in claim 1 wherein the screen is circular-cylindrical, and the magnifying means is a curved mirror with a hyperbolic reflecting surface.

References Cited in the file of this patent

UNITED STATES PATENTS

| | | |
|---|---|---|
| 1,962,873 | Parker | June 12, 1934 |
| 2,307,210 | Goldsmith | Jan. 5, 1943 |
| 2,495,035 | Szeglio | Jan. 17, 1950 |
| 2,513,742 | Pinciroli | July 4, 1950 |